United States Patent
Yoshida

(10) Patent No.: US 7,537,847 B2
(45) Date of Patent: May 26, 2009

(54) FUEL CELL SYSTEM AND METHOD FOR OPERATING SAME

(75) Inventor: Naohiro Yoshida, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 21 days.

(21) Appl. No.: 11/449,729

(22) Filed: Jun. 9, 2006

(65) Prior Publication Data

US 2006/0228601 A1    Oct. 12, 2006

Related U.S. Application Data

(63) Continuation of application No. PCT/JP2005/000263, filed on Jan. 5, 2005.

(30) Foreign Application Priority Data

Jan. 7, 2004    (JP)    ............................. 2004-002172

(51) Int. Cl.
H01M 8/04    (2006.01)
(52) U.S. Cl. .......................................... 429/13; 429/22
(58) Field of Classification Search ................... 429/13, 429/17, 22, 25
See application file for complete search history.

(56) References Cited

U.S. PATENT DOCUMENTS

| | | | |
|---|---|---|---|
| 5,149,599 A | 9/1992 | Kamoshita | |
| 6,800,390 B2 * | 10/2004 | Kashiwagi | ................ 429/22 X |
| 6,916,563 B2 * | 7/2005 | Yamamoto et al. | ............ 429/17 |
| 2002/0094469 A1 | 7/2002 | Yoshizumi et al. | |
| 2003/0198842 A1 | 10/2003 | Nishida et al. | |

FOREIGN PATENT DOCUMENTS

| | | |
|---|---|---|
| JP | A 61-147465 | 7/1986 |
| JP | A 62-259356 | 11/1987 |
| JP | A 2-18870 | 1/1990 |
| JP | A 2-160373 | 6/1990 |
| JP | A 3-105870 | 5/1991 |
| JP | A 8-124588 | 5/1996 |
| JP | A 10-223236 | 8/1998 |
| JP | A 2002-289237 | 10/2002 |
| JP | A 2003-317771 | 11/2003 |
| JP | A 2004-22430 | 1/2004 |
| JP | A 2004-127748 | 4/2004 |

* cited by examiner

*Primary Examiner*—Stephen J. Kalafut
(74) *Attorney, Agent, or Firm*—Oliff & Berridge, PLC

(57) ABSTRACT

A fuel cell system of the present invention comprises a fuel cell which is supplied with a fuel gas and an oxidizing gas to generate electricity, a fuel gas supply interrupting device for interrupting the fuel gas supply to an anode inlet of the fuel cell, and an anode-off gas interrupting device for interrupting the discharge of anode-off gas from an anode outlet of the fuel cell. When a problem occurs in the system, the fuel gas supply interrupting device cuts off the fuel gas supply to the anode inlet, while the anode-off gas interrupting device opens the anode outlet when the problem in the system occurs, and cuts off the anode-off gas once a predetermined condition has been satisfied.

9 Claims, 3 Drawing Sheets

FUEL CELL SYSTEM AND METHOD FOR OPERATING SAME

This is a Continuation of Application No. PCT/JP2005/000263 filed Jan. 5, 2005, which claims the benefit of Japanese Patent Application No. 2004-002172 filed Jan. 7, 2004. The disclosures of the prior applications are hereby incorporated by reference herein in their entirety.

BACKGROUND

The present invention relates to a fuel cell system and a method for operating the fuel cell system, and more particularly to a technique for discharge processing an anode-off gas when the system is halted due to a problem.

A fuel cell system generates electricity using a combustible fuel gas (hydrogen rich gas), and therefore, when a problem occurs in the system, the supply of fuel gas to the fuel cell must be cut off to ensure the safety of the system. For example, Japanese Patent Application Laid-open No. 61-147465 proposes a technique for protecting a fuel cell according to which, during an emergency stoppage caused by operating trouble in the fuel cell, electromagnetic valves disposed at both the inlet and outlet of both an anode and a cathode of the fuel cell stack are closed, and the differential pressure generated between the two electrodes during the emergency stoppage is suppressed to a minimum by providing a constitution in which the anode and cathode are connected to respective inert gas buffer tanks.

SUMMARY

However, when the electromagnetic valves at the inlet and outlet of the anode are closed while an anode gas channel of the fuel cell is pressurized by fuel gas, the fuel gas may pass through the electrolyte and cross-leak into the cathode gas channel. In such a case, when the system is reactivated following a safety inspection, the fuel gas which has cross-leaked into the cathode gas channel is not diluted to a sufficiently low concentration even when pressurized air is supplied to the cathode gas channel by an air compressor, and hence the fuel gas may be pushed out by the pressurized air and discharged from the system as is.

An object of the present invention is to solve this problem by reducing fuel gas cross-leak into a cathode gas channel when a system is halted due to a problem.

To achieve this object, a fuel cell system of the present invention comprises: a fuel cell which is supplied with a fuel gas and an oxidizing gas to generate electricity; a fuel gas supply interrupting device for interrupting the fuel gas supply to an anode inlet of the fuel cell; and an anode-off gas interrupting device for interrupting an anode-off gas discharged from an anode outlet of the fuel cell. When a problem occurs in the system, the fuel gas supply interrupting device cuts off the fuel gas supply to the anode inlet, while the anode-off gas discharge interrupting device keeps the anode outlet open until a predetermined condition is satisfied following the occurrence of the system problem.

Further, an operating method for a fuel cell system according to the present invention is an operating method for a fuel cell system comprising a fuel cell which is supplied with a fuel gas and an oxidizing gas to generate electricity. The operating method comprises the step of cutting off the fuel gas supply to an anode inlet of the fuel cell when a problem occurs in the system while keeping an anode outlet open until a predetermined condition is satisfied following the occurrence of the system problem.

According to the constitution described above, when a problem occurs in the system, the amount of remnant anode gas (hydrogen) in an anode gas channel can be reduced by keeping the anode outlet open until the predetermined condition is satisfied, and thus cross-leakage of the anode gas into a cathode gas channel can be suppressed. Moreover, the discharge of highly concentrated hydrogen gas from the cathode gas channel when the system is reactivated can be reduced. Here, "keeping the anode outlet open" means that the anode-off gas interrupting device is prohibited from blocking the anode outlet. Further, "when a problem occurs in the system" not only indicates detection of a system problem relating to the fuel cell system, but also includes activation of a problem response mode (failsafe mode) of the fuel cell system following detection of the system problem.

Here, the term "predetermined condition" indicates that the amount of anode gas remaining in the fuel cell (in the anode gas channel, for example) when the system is halted due to a problem falls to or below a predetermined amount. Specific examples of the predetermined condition include (1) that the internal pressure of the anode gas channel falls to or below a predetermined pressure, (2) that a predetermined amount of time elapses following the occurrence of the problem in the system, (3) that an integral value of the anode-off gas flow rate from the anode outlet when the system is halted due to a problem exceeds a predetermined flow rate, (4) that the hydrogen concentration of the anode-off gas discharged from the anode outlet when the system is halted due to a problem falls to or below a predetermined concentration, and (5) that the temperature of the anode-off gas discharged from the anode outlet when the system is halted due to a problem falls to or below a predetermined temperature. In a case where the fuel gas supply to the anode inlet is interrupted as the failsafe mode, for example, the "predetermined condition" may be that the anode outlet is kept open for a predetermined time period following interruption of the fuel gas supply to the anode inlet.

The fuel cell system constituted as described above preferably further comprises a suction device for aspirating the anode-off gas that is discharged from the anode outlet, and the suction device is preferably constituted to aspirate the anode-off gas that is discharged from the anode outlet while the anode outlet is open. Also, the operating method for a fuel cell system constituted as described above may further comprise the step of aspirating the anode-off gas that is discharged from the anode outlet while the anode outlet is open. By means of these constitutions, the time period during which the anode outlet is open can be reduced.

A preferred example of the suction device is a circulation pump for circulating the anode-off gas discharged from the anode outlet to the anode inlet. When a pre-existing circulation pump disposed in the hydrogen circulation system is used, the anode-off gas can be aspirated in without adding a new device.

The fuel cell system constituted as described above preferably further comprises a hydrogen concentration reducing device for reducing the hydrogen concentration of the anode-off gas discharged from the anode outlet. Also, the operating method for a fuel cell system constituted as described above may further comprise the step of reducing the hydrogen concentration of the anode-off gas discharged from the anode outlet. By means of these constitutions, the anode-off gas can be discharged from the system after its hydrogen concentration has been reduced sufficiently.

The fuel cell system constituted as described above preferably further comprises an oxidizing gas supply device for supplying the oxidizing gas to a cathode inlet of the fuel cell, and a cathode-off gas passage for introducing a cathode-off gas which is discharged from a cathode outlet of the fuel cell into the hydrogen concentration reducing device. The oxidizing gas supply device preferably introduces the cathode-off gas discharged from the cathode outlet into the hydrogen concentration reducing device by supplying the cathode inlet with the oxidizing gas continuously while the anode outlet is open following the occurrence of the system problem. Also, the operating method for a fuel cell system constituted as described above may further comprise the step of reducing the hydrogen concentration of the anode-off gas discharged from the anode outlet using the cathode-off gas discharged from the cathode outlet by supplying the oxidizing gas to the cathode inlet continuously while the anode outlet is open following the occurrence of the system problem. By means of these constitutions, the hydrogen concentration reducing device can be supplied with the gas required to dilute or burn the anode-off gas, and hence the hydrogen concentration of the anode-off gas can be reduced with stability.

DETAILED DESCRIPTION

Figure 1:
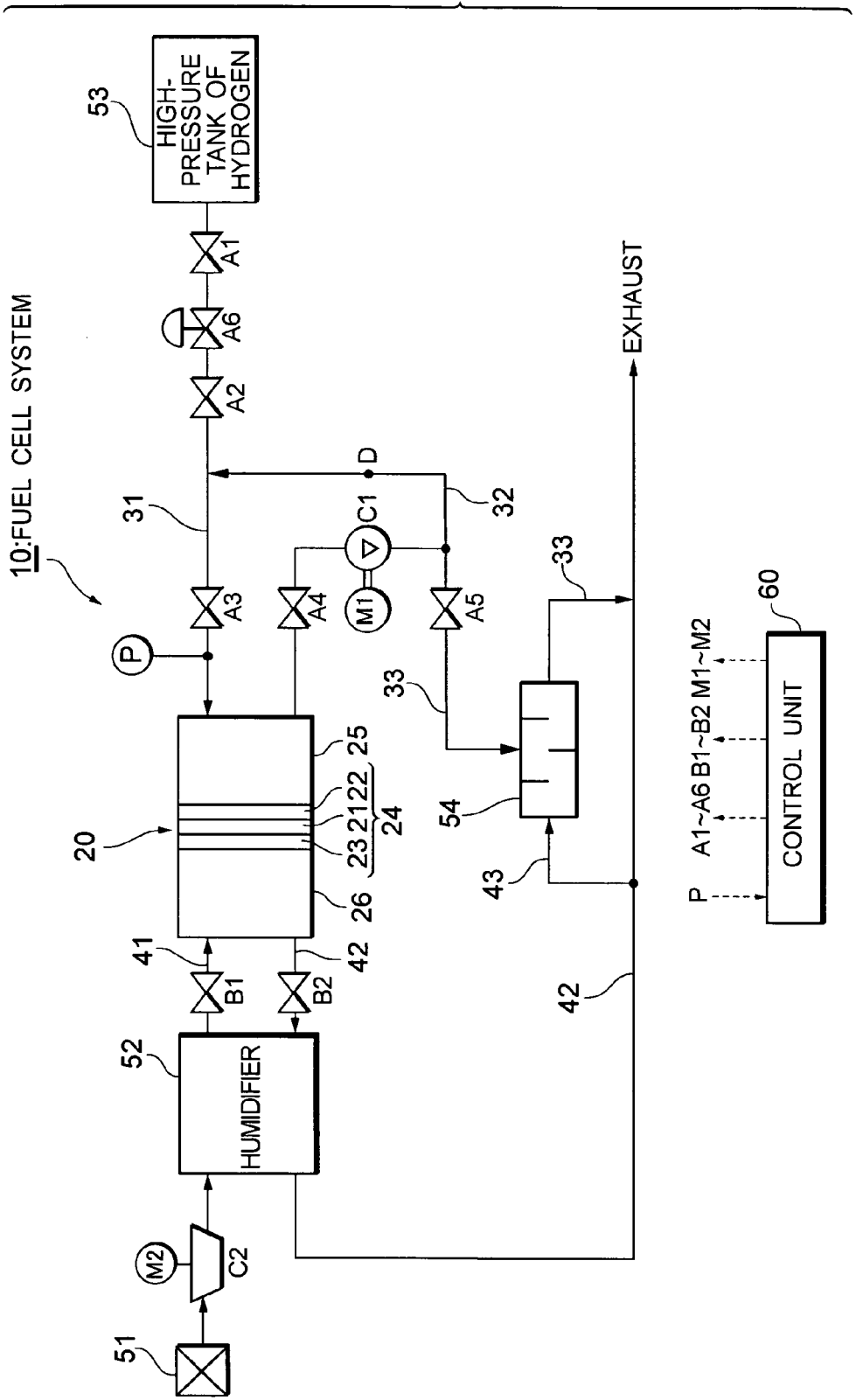
FIG. 1 is a block diagram of the main parts of a fuel cell system according to an embodiment.

FIG. 1 is a block diagram of the main parts of a fuel cell system according to an embodiment.

A fuel cell system 10 is constituted by an on-board power generation device installed in a fuel cell electric vehicle (FCEV) for generating electric power, and comprises a fuel cell 20 which performs power generation upon reception of a supply of a reaction gas (a fuel gas and an oxidizing gas).

The fuel cell 20 comprises a membrane electrode assembly (MEA) 24 in which an anode 22 and a cathode 23 are formed by screen printing or the like on respective surfaces of a polymer electrolyte 21 which is constituted by a proton-conductive ion exchange membrane or the like formed from a fluorine resin. The two surfaces of the membrane electrode assembly 24 are sandwiched by ribbed separators (not shown). A groove-shaped anode gas channel 25 is formed between the separator and the anode 22, and a groove-shaped cathode gas channel 26 is formed between the separator and the cathode 23. An oxidation reaction shown in Equation (1) occurs in the anode 22, while a reduction reaction shown in Equation (2) occurs in the cathode 23. An electrochemical reaction shown in Equation (3) occurs in the fuel cell 20 as a whole.

$$H_2 \rightarrow 2H^+ + 2e^- \quad (1)$$

$$(\tfrac{1}{2})O_2 + 2H^+ + 2e \rightarrow H_2O \quad (2)$$

$$H_2 + (\tfrac{1}{2})O_2 \rightarrow H_2O \quad (3)$$

For ease of description, the structure of a single cell constituted by the membrane electrode assembly 24, the anode gas channel 25, and the cathode gas channel 26 is illustrated schematically in the drawing, but in reality, a stack structure is formed by connecting a plurality of single cells in series via the aforementioned ribbed separators.

An oxidizing gas passage 41 for supplying oxidizing gas to the cathode gas channel 26 and a cathode-off gas passage 42 for discharging effluent cathode-off gas (oxygen-off gas) from the cathode gas channel 26 are disposed in an oxidizing gas supply system of the fuel cell system 10. Cathode-off gas is exhaust gas discharged from a cathode outlet. A cathode inlet valve B1 for interrupting the flow of oxidizing gas into the cathode inlet is provided in the oxidizing gas passage 41, and a cathode outlet valve B2 for interrupting the flow of cathode-off gas from the cathode outlet is provided in the cathode-off gas passage 42. These valves B1, B2 are constituted by shut valves (electromagnetic valves) or the like, for example. The valve B1 functions as an oxidizing gas supply interrupting device for cutting off the supply of oxidizing gas to the cathode inlet, while the valve B2 functions as a cathode-off gas discharge interrupting device for cutting off the discharge of cathode-off gas from the cathode outlet. Air taken in from the atmosphere via an air filter 51 is pressurized by an air compressor (oxidizing gas supply device) C2 which is driven by a motor M2, humidified to an appropriate degree by a humidifier 52, and then caused to flow through the oxidizing gas passage 41 into the cathode gas channel 26. Moisture exchange occurs in the humidifier 52 between the cathode-off gas, which is in a state of high humidity due to the water generated by the cell reaction of the fuel cell 20, and the low-humidity oxidizing gas taken in from the atmosphere. The cathode-off gas flowing through the cathode-off gas passage 42 is discharged to the outside of the vehicle.

Meanwhile, a fuel gas passage 31 for supplying fuel gas to the anode gas channel 25 and a circulation passage 32 for circulating anode-off gas (hydrogen-off gas) discharged from the anode gas channel 25 to the anode 22 are disposed in a fuel gas supply system of the fuel cell system 10. Anode-off gas is exhaust gas discharged from an anode outlet. The fuel gas passage 31 and circulation passage 32 constitute a hydrogen circulation system. A tank valve (mains valve) A1 of a high-pressure tank of hydrogen 53, a regulator A6 for regulating the pressure of the fuel gas, a supply valve A2 for controlling fuel gas supply/interruption from the high-pressure tank of hydrogen 53 to the fuel gas passage 31, an anode inlet valve A3 for interrupting the flow of fuel gas into the anode inlet, and a pressure sensor P for detecting the internal pressure (gas pressure) of the anode gas channel 25 are provided in the fuel gas passage 31. The valves A1 to A3 are constituted by shut valves (electromagnetic valves) or the like, for example, and function as a fuel gas supply interrupting device for interrupting the supply of fuel gas to the anode inlet.

An anode outlet valve A4 for interrupting the discharge of the anode-off gas that flows out from the anode outlet and a circulation pump C1 for circulating the anode-off gas to the fuel gas passage 31 are disposed in the circulation passage 32. The anode-off gas, which undergoes pressure loss as it passes through the anode gas channel 25, is pressurized to an appropriate pressure by the circulation pump C1, which is driven by a motor M1, and then guided to the fuel gas passage 31. An anode-off gas passage 33 for purging a part of the anode-off gas from the circulation passage 32 out of the system when components of the circulating hydrogen other than hydrogen have increased in concentration is disposed so as to bifurcate from the circulation passage 32. The anode-off gas purging operation can be regulated by a hydrogen discharge valve A5 disposed in the anode-off gas passage 33. The circulation passage 32 and anode-off gas passage 33 constitute an anode-off gas discharge system. The aforementioned valves A4 and A5 are constituted by shut valves (electromagnetic valves) or the like, for example, and function as an anode-off gas interrupting device for interrupting the discharge of anode-off gas from the anode outlet.

A diluter 54 is provided on the anode-off gas passage 33 for diluting the anode-off gas (diluted gas) with a part of the cathode-off gas (dilution gas) to decrease the hydrogen concentration of the anode-off gas. A branch passage 43 communicating with the diluter 54 bifurcates from the cathode-off gas passage 42 and serves to guide a part of the cathode-off gas to the diluter 54 as dilution air. Instead of the diluter 54 described above, a catalytic combustor (hydrogen combustor) or the like may be employed favorably as the hydrogen concentration reducing device disposed in the anode-off gas discharge system, for example.

A control unit 60 controls the entire system, and when a problem occurs in the system, executes system stoppage processing in accordance with an anode-off gas discharge procedure to be described below. In this procedure, the control unit 60 monitors the internal pressure of the anode gas channel 25 on the basis of a sensor signal from the pressure sensor P, and if necessary performs an operation to close the valves A1 to A6 (a gas interrupting operation) by drive-controlling the motors M1, M2 to adjust the rotation speed of the circulation pump C1 and the air compressor C2.

Next, the anode-off gas discharge processing performed when a problem occurs in the system will be described in outline.

(1) When the presence of a problem is determined in a problem diagnosis relating to factors such as the temperature, pressure, voltage, current, hydrogen safety, and high voltage safety of the components of the main devices, auxiliary devices, and so on in the fuel cell system 10 and the system is halted, the control unit 60 closes the valves A1 to A3 provided in the fuel gas supply system, thereby interrupting the supply of fuel gas to the fuel cell 20.

(2) The control unit 60 forcibly opens the anode outlet until the internal pressure of the anode gas channel 25 falls to or below a predetermined pressure or until a predetermined amount of time has passed from the occurrence of the problem in the system (for example, a predetermined amount of time following closure of the valves A1 to A3). By forcibly opening the anode outlet for a certain amount of time during a system stoppage, the anode-off gas retained in the anode gas channel 25 is discharged from the fuel cell without passing through the polymer electrolyte 21 and cross-leaking into the cathode gas channel 26. The anode-off gas discharged from the fuel cell flows into the diluter 54. To ensure the safety of the system and so on, hydrogen gas which cross-leaks into the cathode gas channel 26 when the system is halted due to a problem must be diluted sufficiently to ensure that this hydrogen gas is not discharged from the cathode gas channel 26 as highly concentrated hydrogen gas when the system is reactivated, and this problem can be solved by subjecting the anode-off gas to the discharge processing described above.

(3) When a system stoppage is performed, operations of all auxiliary devices are preferably halted, but if the air compressor C2 is in an operable state, the air compressor C2 is preferably operated to introduce pressurized air into the diluter 54. In so doing, the anode-off gas retained in the diluter 54 can be diluted to a sufficiently low concentration.

(4) Furthermore, when the hydrogen discharge valve A5 is disposed on the downstream side of the circulation pump C1 (as in the system configuration shown in FIG. 1, for example) and the circulation pump C1 is operable, the circulation pump C1 is preferably operated to promote discharge (forcible discharge) of the anode-off gas from the fuel cell. By forcibly discharging the anode-off gas in this manner, the time period during which the anode outlet is open can be reduced, and hence the system stoppage processing can be shortened. The circulation pump C1 functions as a suction device for forcibly aspirating anode-off gas from the anode outlet.

Note that in a system configuration in which the hydrogen discharge valve A5 is disposed on the upstream side of the circulation pump C1 (when the circulation pump C1 is disposed in a position D of FIG. 1, for example), the anode-off gas cannot be discharged forcibly by operating the circulation pump C1, and hence in this case there is no need to operate the circulation pump C1.

(5) When the internal pressure of the anode gas channel 25 has fallen sufficiently to a pressure at which cross-leakage does not occur, the valves A4 and A5 are closed, thereby interrupting the anode-off gas discharge system. Thus the system stoppage processing ends.

Figure 2:
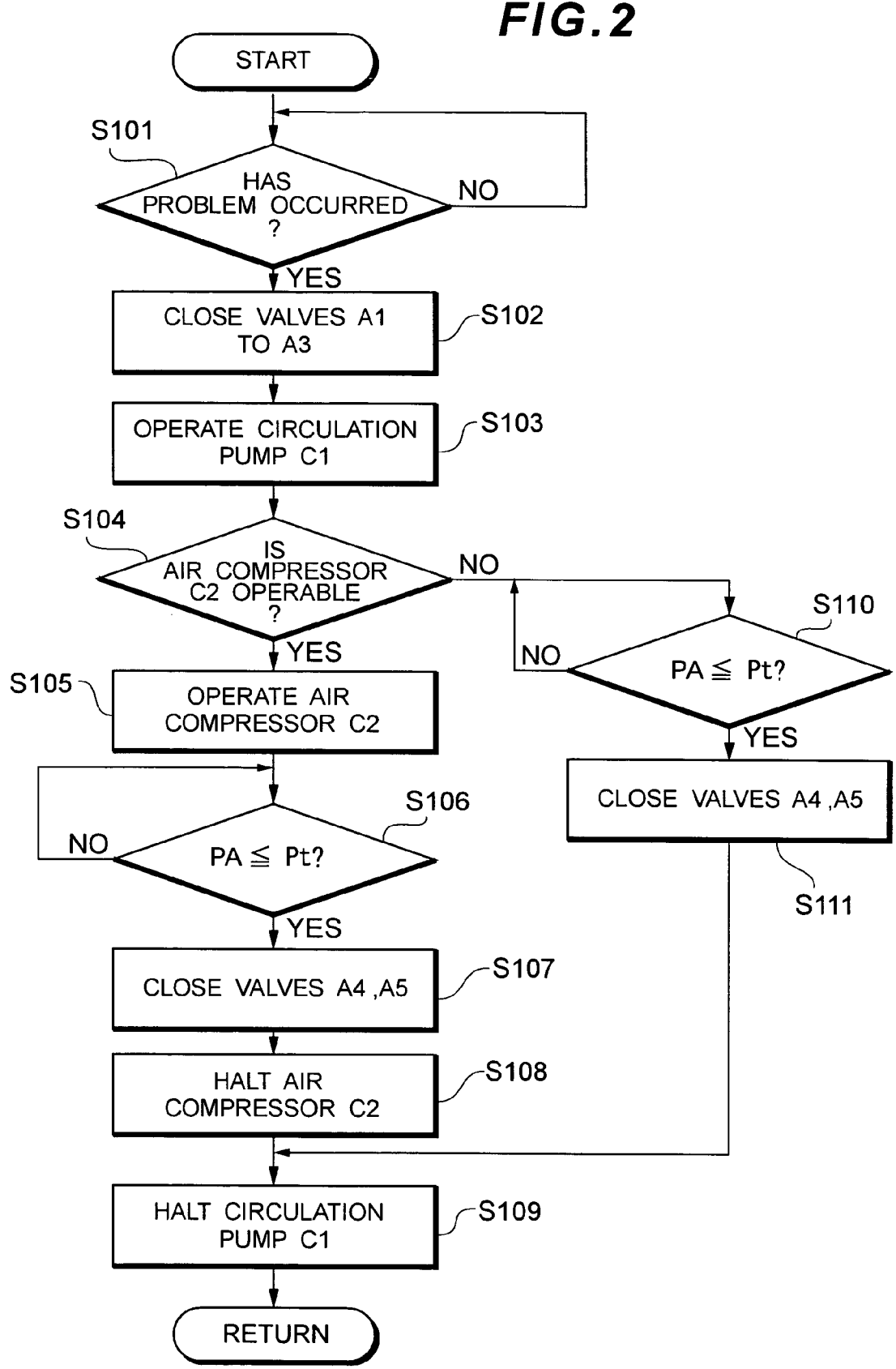
FIG. 2 is a first control routine showing an anode-off gas discharge processing procedure.

FIG. 2 shows a first control routine describing a control procedure performed when the system is halted due to a problem.

This control routine assumes that the hydrogen discharge valve A5 is disposed on the downstream side of the circulation pump C1, and that the circulation pump C1 is operable.

When the control routine is called up from a main control program, the control unit 60 checks whether or not a problem has occurred in the system (S101). The occurrence of a problem in the system is checked by a diagnostic program for diagnosing problems relating to temperature, pressure, voltage, current, hydrogen safety, high voltage safety, and so on. When "problem" is determined (S101; YES), the control unit 60 closes the valves A1 to A3, thereby interrupting the fuel gas supply system (S102). At this time, the anode outlet is open. Next, the circulation pump C1 is operated to forcibly discharge the anode-off gas to the diluter 54 (S103).

Next, a check is performed as to whether or not the air compressor C2 is operable (S104). When operable (S104; YES), the air compressor C2 is operated such that dilution air is introduced into the diluter 54 to dilute the anode-off gas (S105). Next, an internal pressure PA of the anode gas channel 25, detected by the pressure sensor P, is compared to a predetermined threshold Pt, and a check is performed as to whether or not $PA \leq Pt$ (S106). The threshold Pt is preferably set to a pressure value at which the anode-off gas does not cross-leak. When the internal pressure PA is equal to or less than the threshold Pt (S106; YES), the valves A4 and A5 disposed in the anode-off gas discharge system are closed to interrupt the discharge of anode-off gas (S107). The air compressor C2 and circulation pump C1 are then halted in succession (S108, S109).

On the other hand, when the air compressor C2 is inoperable due to a problem in the power source system or the like, for example (S104; NO), the internal pressure PA is compared to the threshold Pt with the air compressor C2 halted, and a check is performed as to whether or not $PA \leq Pt$ (S110). When the internal pressure PA is equal to or less than the threshold Pt (S110; YES), the control unit 60 closes the valves A4, A5 (S111), and also halts the circulation pump C1 (S109).

Figure 3:
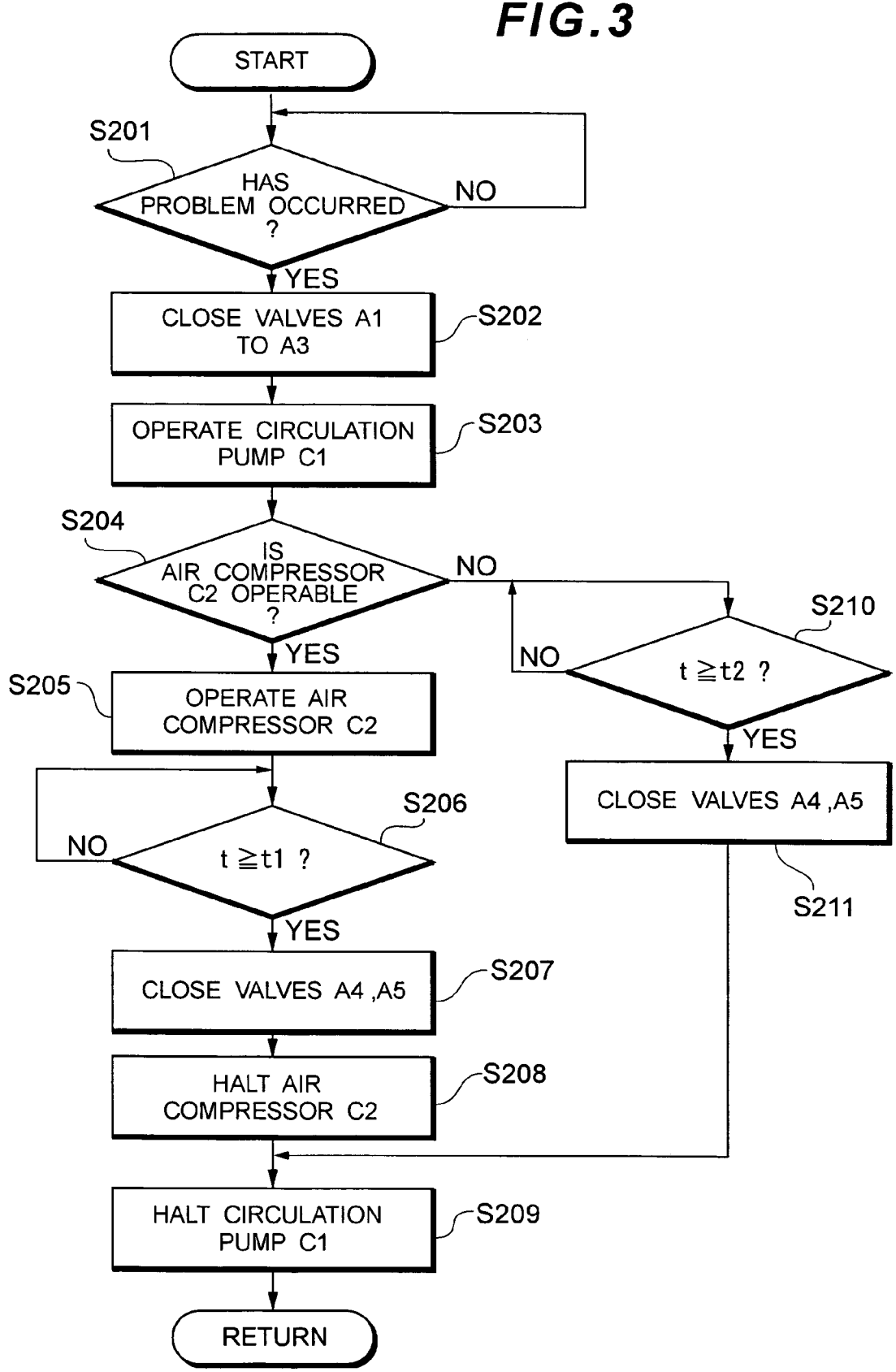
FIG. 3 is a second control routine showing an anode-off gas discharge processing procedure.

FIG. 3 shows a second control routine describing a control procedure performed when the system is halted due to a problem.

S201 to S211 of this control routine correspond to S101 to S111 of the first control routine.

When the control routine is called up from a main control program, the control unit 60 checks whether or not a problem has occurred in the system (S201). When "problem" is determined (S201; YES), the control unit 60 closes the valves A1 to A3, thereby interrupting the fuel gas supply system (S202). At this time, the anode outlet is open. Next, the circulation pump C1 is operated to forcibly discharge the anode-off gas to the diluter 54 (S203). Next, a check is performed as to whether or not the air compressor C2 is operable (S204). When operable (S204; YES), the air compressor C2 is operated such that dilution air is introduced into the diluter 54 to dilute the anode-off gas (S205).

Next, an elapsed time t following interruption of the fuel gas supply system is compared to a predetermined threshold t1, and a check is performed as to whether or not t≧t1 (S206). The threshold t1 is preferably set to a time period in which the anode-off gas does not cross-leak. When the elapsed time t is equal to or greater than the threshold t1 (S206; YES), the valves A4 and A5 disposed in the anode-off gas discharge system are closed to interrupt the discharge of anode-off gas (S207). The air compressor C2 and circulation pump C1 are then halted in succession (S208, S209).

On the other hand, when the air compressor C2 is inoperable due to a problem in the power source system or the like, for example (S204; NO), the elapsed time t following interruption of the fuel gas supply system is compared to a predetermined threshold t2 with the air compressor C2 halted, and a check is performed as to whether or not t≧t2 (S210). Since the air compressor C2 is inoperable, the threshold t2 is preferably set to be slightly longer than the threshold t1. When the elapsed time t is equal to or greater than the threshold t2 (S210; YES), the valves A4, A5 disposed in the anode-off gas discharge system are closed (S211), and then the circulation pump C1 is halted (S209).

Thus, the fuel gas supply interrupting device (the valves A1 to A3) is controlled such that the supply of fuel gas to the anode inlet is interrupted while the anode outlet is opened forcibly for a certain time period, and once the internal pressure of the anode gas channel 25 has fallen to or below the predetermined pressure Pt or the predetermined time t1 (or t2) has elapsed, the anode-off gas interrupting device (valves A4, A5) is controlled such that anode-off gas discharge from the anode outlet is interrupted. In so doing, the pressure of the remaining hydrogen in the anode gas channel 25 can be reduced, and cross-leakage of the anode-off gas into the cathode gas channel 26 can be suppressed. As a result, the discharge of highly concentrated hydrogen from the cathode gas channel 26 when the system is reactivated can be suppressed.

Furthermore, anode-off gas can be aspirated from the anode outlet and discharged forcibly from the fuel cell by the pump action (suction action) of the circulation pump C1 disposed in the anode-off gas discharge system, enabling a reduction in the time period during which the anode outlet is open. Further, by disposing a hydrogen concentration reducing device such as the diluter 54 in the anode-off gas discharge system, the anode-off gas can be discharged from the system after its hydrogen concentration has been reduced sufficiently. In other words, when the system is halted due to a problem, the tank valve A1, supply valve A2, and anode inlet valve A3 are closed, the anode outlet valve A4 and hydrogen discharge valve A5 are opened, and the circulation pump C1 is operated, whereby the gas remaining in the anode is discharged from the fuel cell. While the circulation pump C1 is operative, the air compressor C2 is preferably operated with the cathode inlet valve B1 and cathode outlet valve B2 kept open so that air can be supplied to the cathode gas channel 26 and dilution air can be introduced into the diluter 54 disposed downstream of the cathode. In so doing, the anode-off gas that flows into the diluter 54 when the system is halted due to a problem can be diluted sufficiently. Once the amount of anode gas remaining in the anode gas channel 25 has decreased to or below a predetermined amount, the anode outlet valve A4 and hydrogen discharge valve A5 are closed, and the circulation pump C1 is halted.

Note that in this embodiment, an example was described in which the condition of the check as to whether or not the remaining amount of anode gas in the fuel cell has fallen to or below the predetermined amount when the system is halted due to a problem is (1) that the internal pressure of the anode gas channel falls to or below a predetermined pressure, or (2) that a predetermined amount of time elapses following the occurrence of the problem in the system. However, the present invention is not limited to this example, and the determination as to whether or not the remaining anode gas amount has fallen to or below the predetermined amount may be made by detecting a physical quantity relating to the remaining anode gas amount. For example, the condition of the check as to whether or not the remaining amount of anode gas in the fuel cell has fallen to or below the predetermined amount when the system is halted due to a problem may be (3) that an integral value of the anode-off gas flow rate from the anode outlet when the system is halted due to a problem exceeds a predetermined flow rate, (4) that the hydrogen concentration of the anode-off gas discharged from the anode outlet when the system is halted due to a problem falls to or below a predetermined concentration, (5) that the temperature of the anode-off gas discharged from the anode outlet when the system is halted due to a problem falls to or below a predetermined temperature, and so on.

Further, the system configuration of this embodiment may be modified such that the circulation passage 32 and circulation pump C1 are omitted and the anode-off gas is discharged from the system via the anode-off gas interrupting device (at least one of the valve A4 and the valve A5). Also, the circulation pump C1 may be halted while the anode outlet is open. Further, a bypass passage communicating with the exterior of the system may be provided upstream of the circulating passage 32, and the bypass passage may be opened during the processing that is performed when the system is halted due to a problem. Also, a combustor (catalytic) may be provided in place of the diluter 54. Moreover, the operation of the air compressor C2 on the cathode side and the supply of cathode-off gas to the diluter 54 may respectively be omitted.

The present invention is capable of reducing the pressure of remnant anode gas in an anode gas channel and suppressing cross-leakage of the anode gas into a cathode gas channel when a problem occurs in the system by keeping an anode outlet open until a predetermined condition is satisfied. This is beneficial for a fuel cell system in which reductions are required in the discharge of highly concentrated hydrogen gas from the cathode gas channel upon reactivation of the system, and hence the present invention may be used widely in such fuel cell systems.

I claim

1. A fuel cell system comprising:
   a fuel cell which is supplied with a fuel gas and an oxidizing gas to generate electricity;
   a fuel gas supply interrupting device for interrupting said fuel gas supply to an anode inlet of said fuel cell;
   an anode-off gas interrupting device for interrupting an anode-off gas discharged from an anode outlet of said fuel cell;
   a diluter for reducing a hydrogen concentration of said anode-off gas discharged from said anode outlet;
   an oxidizing gas supply device for supplying said oxidizing gas to a cathode inlet of said fuel cell; and
   a cathode-off gas passage for introducing a cathode-off gas discharged from a cathode outlet of said fuel cell into said diluter,
   wherein when a problem occurs in said system, said fuel gas supply interrupting device cuts off said fuel gas supply to said anode inlet, while said anode-off gas interrupting device keeps said anode outlet open until a predetermined condition is satisfied following the occurrence of said system problem, and said oxidizing gas supply device introduces said cathode-off gas discharged from said cathode outlet into said diluter by supplying said oxidizing gas continuously to said cathode inlet while said anode outlet is open following the occurrence of said system problem.

2. The fuel cell system according to claim 1, wherein said predetermined condition is that an internal pressure of an anode gas channel falls to or below a predetermined pressure.

3. The fuel cell system according to claim 1, wherein said predetermined condition is that a predetermined time period elapses following the occurrence of said system problem.

4. The fuel cell system according to claim 1, further comprising a suction device for aspirating said anode-off gas that is discharged from said anode outlet, wherein said suction device aspirates said anode-off gas that is discharged from said anode outlet while said anode outlet is open.

5. The fuel cell system according to claim 4, wherein said suction device is a circulation pump for circulating said anode-off gas discharged from said anode outlet to said anode inlet.

6. An operating method for a fuel cell system comprising a fuel cell which is supplied with a fuel gas and an oxidizing gas to generate electricity, the method comprising the steps of:

cutting off said fuel gas supply to an anode inlet of said fuel cell when a problem occurs in said system, while keeping an anode outlet open until a predetermined condition is satisfied following the occurrence of said system problem; and reducing in a diluter a hydrogen concentration of an anode-off gas discharged from said anode outlet using a cathode-off gas discharged from a cathode outlet by supplying said oxidizing gas continuously to a cathode inlet while said anode outlet is open following the occurrence of said system problem.

7. The operating method for a fuel cell system according to claim 6, further comprising the step of aspirating said anode-off gas discharged from said anode outlet while said anode outlet is open.

8. The fuel cell system according to claim 2, further comprising a suction device for aspirating said anode-off gas that is discharged from said anode outlet, wherein said suction device aspirates said anode-off gas that is discharged from said anode outlet while said anode outlet is open.

9. The fuel cell system according to claim 3, further comprising a suction device for aspirating said anode-off gas that is discharged from said anode outlet, wherein said suction device aspirates said anode-off gas that is discharged from said anode outlet while said anode outlet is open.

* * * * *